US005323559A

United States Patent [19]
Allman

[11] Patent Number: 5,323,559
[45] Date of Patent: Jun. 28, 1994

[54] COLLAPSIBLE PLANT SUPPORT

[76] Inventor: Bernice F. Allman, 3714 Hillcrest, Boise, Id. 83705

[21] Appl. No.: 42,170

[22] Filed: Apr. 5, 1993

[51] Int. Cl.$^5$ .............................................. A01G 17/06
[52] U.S. Cl. ........................................ 47/45; 47/28.1; 52/646
[58] Field of Search .................. 47/45 C, 45 R, 28.1; 52/649.4, 646

[56] References Cited

U.S. PATENT DOCUMENTS

| 374,906 | 12/1887 | Rovane | 47/45 C |
| 4,005,548 | 2/1977 | Nahon | 47/45 C |
| 4,073,091 | 2/1978 | Vogel | 47/45 C |

FOREIGN PATENT DOCUMENTS

| 29703 | 1/1922 | Denmark | 52/649.4 |
| 65052 | 8/1939 | Switzerland | 47/45 C |

Primary Examiner—Henry E. Raduzao
Attorney, Agent, or Firm—Paul F. Horton

[57] ABSTRACT

A plant support for vegetables, flowers, and fruit, including a plurality of vertical rods, laterally spaced and linked together by a plurality of horizontal rings constructed of a multiplicity of horizontal rods to define a plant enclosure having numerous rectangular openings for supporting plant branches. Each of the horizontal rods define, on their opposing ends, a cylindrical portion for rotatably engaging respective adjacent vertical rods to permit the manipulation of the plant support to a variety of shapes in encircling a plant, when in the upright position and to define a protective cage for bedding plants when in the horizontal position. The cylindrical portions are preferably helical in shape and interwound with helical portions of adjacent horizontal rods for superior strength and frictional support for holding the plant support in a selected mode. In that each horizontal rod fully rotates in its engagement with a vertical rod, the plant support readily collapses to a width approximating one-half the circumference.

4 Claims, 1 Drawing Sheet

COLLAPSIBLE PLANT SUPPORT

BACKGROUND OF THE INVENTION

1. Field of the Invention

This invention relates, in general, to plant support apparatus, and, in particular, to plant supports which are collapsible and which may be manipulated to provide plant enclosures and bedding protectors of selected shape for a covering.

2. Description of the Prior Art

The desirability of having a plant support to aid a plant in maintaining its stalk or trunk integrity and to support branches, and particularly fruit bearing branches, has long been recognized.

Besides providing support to the plant to prevent bending or destruction by strong winds or the weight of the plant itself, it is important to keep fruit from contacting the ground. It is also important that the support be collapsible for storage. Inventions including such structure are typified by U.S. Pat. Nos. 4,073,091, issued to Vogel; 4,005,548, issued to Nahon; 4,211,033 issued to Ringer and 3,113,400, issued to Edmond.

Existing plant supports fail to provide a plant support with a sufficient number of sides such as to remain close to the plant and yet remain collapsible. Five, and preferably more side portions, have been found necessary to encircle a plant so that the side portions adequately support branches of varying length. It is also highly preferred that each vertical rod be rotatably connected to horizontal rods so as to pivot substantially 360° so that the plant support may assume a variety of shapes, as viewed in horizontal cross-section, as it encircles the plant. This is true because of the irregular shape of most plants.

It is also important that all horizontal rods be frictionally held in vertical orientation and parallel spaced from other horizontal rods of adjacent horizontal rings, while being fully rotatable.

SUMMARY OF THE INVENTION

These and other problems are solved by the present invention which includes a plurality of vertical rods, preferably five or more and preferably an even number, and a plurality of horizontal rings, vertically and parallel spaced from one another; each ring including a multiplicity of horizontal rods; each rod rotatably engageable with each vertical rod with which it is connected to an angle approximating 360°. To prevent vertical slippage of the horizontal rods, each horizontal rod is provided, on opposing ends, with a cylindrical helix, interwound with a cylindrical helix of an adjacent, laterally spaced, horizontal rod; each of the helixes encircling respective adjacent vertical rods. Such structure permits extensive rotation of each vertical rod relative to the connecting horizontal rods, while the horizontal rods are held in vertical orientation because of the frictional contact between the helixes and the vertical rods.

Additional objects and advantages will become apparent and a more thorough and comprehensive understanding may be had from the following description taken in conjunction with the accompanying drawings forming a part of this specification.

DETAILED DESCRIPTION OF THE INVENTION

Figure 1:
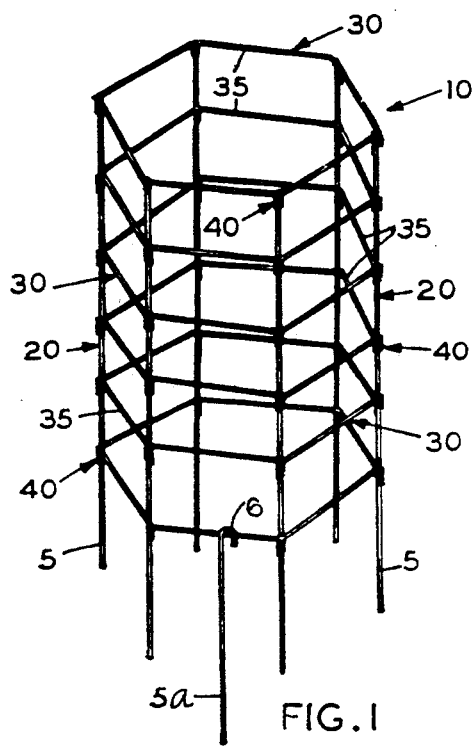
FIG. 1 is a perspective view of the plant support of the present invention in an upright, plant supporting mode.

Referring now to the drawings, an embodiment to be preferred of a plant support 10 made according to the present invention is disclosed. Plant support 10 includes, generally, a plurality of vertical rods 20, laterally spaced and parallel with one another and a plurality of horizontal rings 30 vertically spaced and parallel with one another. The vertical rods and horizontal rings define a series of rectangular openings for receiving foliage of the plant. The lowermost portion of vertical rods 20 may extend below the lowermost horizontal ring for unitary use as stakes 5 for piercing the soil to support the framework.

The vertical rods may be rigid or slightly flexible. It has been found that galvanized wire works well and has the advantage of rust prevention for year to year use. Where galvanized wire is used, separate rigid stakes 5a, having a hook 6 for engaging horizontal rods may be desirable if the soil is excessively hard. The vertical rods may be of any desired height, depending upon the type of plant supported.

Horizontal rings 30 are constructed of a multiplicity of horizontal rods 35 which, like the vertical rods, may be constructed of galvanized wire. Horizontal rods 35 extend between adjacent vertical rods and are rotatably connected to the vertical rods for substantial three hundred sixty degree rotation. To provide such rotation, each of the horizontal rods 35 are provided at opposing ends with a cylindrical portion 40 for encircling respective vertical rods. The cylindrical portion must snugly engage the vertical rod to prevent the horizontal rods from slipping downwardly.

Figure 6:
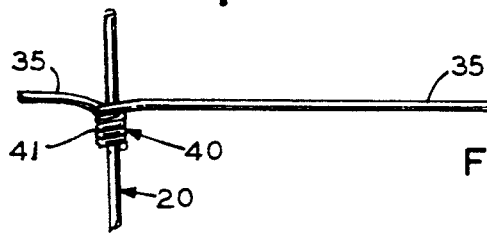
FIG. 6 is a sectional view taken along line 6—6 of FIG. 5.
Figure 5:
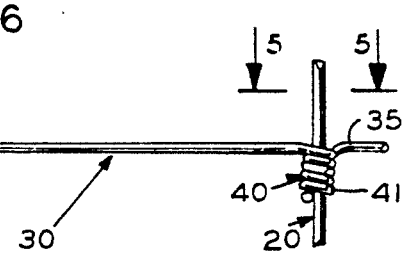
FIG. 5 is a sectional view taken along line 5—5 of FIG. 2.
Figure 2:
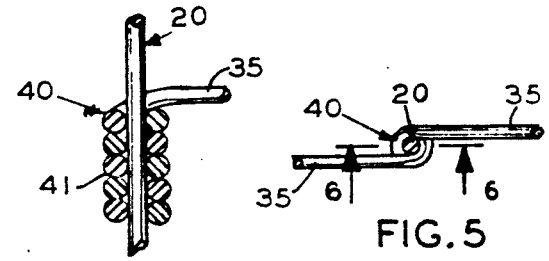
FIG. 2 is a frontal view of a section of the plant support showing connection between vertical rods and horizontal rods.

To correct the slippage problem and yet permit substantially complete rotation of each horizontal rod relative to each vertical rod, cylindrical portions 40 of opposing ends of each horizontal rod are shaped into cylindrical helixes 41. The helixes are loosely wound so that the helixes of adjacent horizontal rods are interwound, as shown in FIGS. 2, 5, and 6. Such interwound helixes provide support for each other and also provide additional frictional contact with each vertical rod which they engage.

Figure 3:
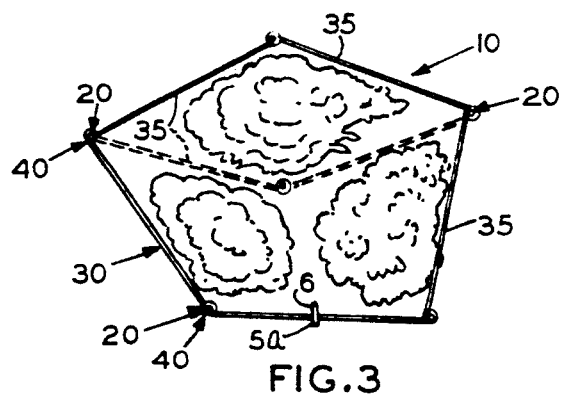
FIG. 3 is a plan view showing the plant support's capacity to define varying shapes for superior plant support.
Figure 4:
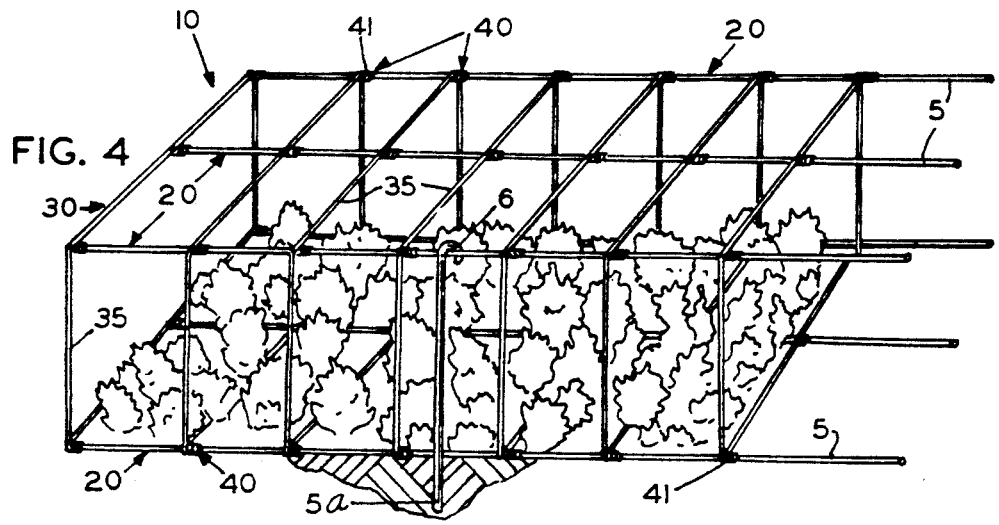
FIG. 4 is a perspective view of the plant support as laid on its side to cover for bedding use.

The spacing of vertical rods and horizontal rods making up the horizontal rings may be of any satisfactory dimension, depending upon the plant supported. For tomato plants each vertical rod and each horizontal ring are space approximately six to eight inches apart to define square openings to provide ready access to the fruit within the enclosure. It is an important aspect of this invention that the polygon defined by the enclosure, in horizontal cross-section, include five or more vertical rods so that the plant support 10 may encircle a plant effectively, as shown in FIG. 3. Where branches extend greater and lesser distances from the stalk or trunk, a polygon with a large number of vertical rods and hence sides, permits close proximity to the stalk for supporting shorter branches, as shown by the dotted lines in FIG. 3. It will be appreciated that where larger numbers of vertical rods are used and where the angle defined by a vertical rod and rotatably connected horizontal rods approximate 0°–360°, that the enclosure defined by plant support 10 may closely approximate the branching of the plant for superior support of the branches. Further, where each horizontal rod rotatably engages adjacent vertical rods, the plant support may be collapsed for packaging, shipping, and storage to a width only slightly greater that the distance between vertical rods; the length obviously being equal to the length of the vertical rods. Such collapsibility also allows plant support 10 to be used for bedding plant purposes, as shown in FIG. 4, when the plant support is laid upon its side. Height and width of the framework is readily adjustable because of connectors 40.

Having thus described in detail a preferred selection of embodiments of the present invention, it is to be appreciated and will be apparent to those skilled in the art that many physical changes could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. A collapsible plant support comprising:
   a plurality of vertically upright rods laterally spaced and parallel to one another; and
   a plurality of horizontal rings, vertically and parallel spaced from one another; each of said rings defined by a multiplicity of horizontal rods, each of said horizontal rods extending between adjacent vertical rods and each of said horizontal rods provided at opposing ends with a cylindrical portion defining a cylindrical helix and wherein cylindrical helixes of adjacent horizontal rods are interwound with one another for rotational engagement with one another and with respective vertical rods; said vertical rods and horizontal rings defining a collapsible enclosure.

2. The plant support as described in claim 1 further comprising a plurality of stake members for holding said plant support in an upright position.

3. The plant support as described in claim 2 wherein one or more stake members are unitary with a respective vertical rod.

4. The plant support as described in claim 1 wherein said plant support includes five or more vertically upright rods.

* * * * *